US010645875B2

(12) United States Patent
Dilts

(10) Patent No.: US 10,645,875 B2
(45) Date of Patent: May 12, 2020

(54) METHOD AND SYSTEM FOR UNLOADING HARVESTED CROP FROM AN AGRICULTURAL HARVESTER

(71) Applicant: CNH Industrial America, LLC, New Holland, PA (US)

(72) Inventor: Mark D. Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 384 days.

(21) Appl. No.: 15/787,803

(22) Filed: Oct. 19, 2017

(65) Prior Publication Data

US 2019/0116730 A1    Apr. 25, 2019

(51) Int. Cl.
*A01D 41/127*    (2006.01)
*A01D 41/12*    (2006.01)
*A01F 12/46*    (2006.01)

(52) U.S. Cl.
CPC ..... *A01D 41/1271* (2013.01); *A01D 41/1217* (2013.01); *A01D 41/1275* (2013.01); *A01F 12/46* (2013.01)

(58) Field of Classification Search
None
See application file for complete search history.

(56) References Cited

U.S. PATENT DOCUMENTS

| | | | | |
|---|---|---|---|---|
| 3,593,720 A | * | 7/1971 | Botterill | A01D 41/1276 460/1 |
| 3,841,536 A | | 10/1974 | Maiste et al. | |
| 3,872,982 A | * | 3/1975 | Rowland-Hill | A01D 41/1217 414/326 |
| 3,938,684 A | * | 2/1976 | Quoiffy | A01D 41/1217 414/504 |
| 5,343,761 A | * | 9/1994 | Myers | A01C 7/105 73/861 |

(Continued)

FOREIGN PATENT DOCUMENTS

| | | |
|---|---|---|
| EP | 2123510 A1 | 11/2009 |
| EP | 2245917 A2 | 11/2010 |
| EP | 2952085 A1 | 12/2015 |

OTHER PUBLICATIONS

Extended European Search Report for EP Application No. 18200514.0 dated Mar. 25, 2019 (f4 pages).

*Primary Examiner* — Navid Ziaeianmehdizadeh
(74) *Attorney, Agent, or Firm* — Peter K. Zacharias; Patrick M. Sheldrake

(57) ABSTRACT

In one aspect, a method for unloading harvested crop from an agricultural harvester may include monitoring a quantity of the harvested crop discharged from the harvester based on sensor data indicative of the quantity of the harvested crop discharged from the harvester. The method may further include controlling an operation of a flow control device of the harvester to halt transfer of the harvested crop from a crop tank of the harvester to a crop discharge system of the harvester when a first quantity of the harvested crop has been discharged from the harvester. Additionally, the method may include continuing to control an operation of the crop discharge system after halting further transfer of the harvested crop from the crop tank to the crop discharge system to convey any remaining harvested crop contained within the crop discharge system to the discharge location.

20 Claims, 8 Drawing Sheets

(56) References Cited

U.S. PATENT DOCUMENTS

| | | | |
|---|---|---|---|
| 5,686,671 A | 11/1997 | Nelson et al. | |
| 6,192,664 B1* | 2/2001 | Missotten | A01D 41/1274 460/1 |
| 6,460,008 B1* | 10/2002 | Hardt | A01D 41/1272 460/1 |
| 6,644,005 B1* | 11/2003 | Grahl | A01F 15/085 100/88 |
| 6,899,616 B1 | 5/2005 | Murray et al. | |
| 9,043,096 B2* | 5/2015 | Zielke | A01D 41/1275 701/50 |
| 9,254,773 B2* | 2/2016 | Farley | B60P 1/42 |
| 9,516,811 B1 | 12/2016 | Kile | |
| 9,907,232 B2* | 3/2018 | Rosseel | A01F 15/042 |
| 10,214,362 B2* | 2/2019 | Farley | A01D 41/1217 |
| 2003/0079956 A1* | 5/2003 | Reimer | A01D 41/1217 193/1 |
| 2006/0104770 A1* | 5/2006 | Talbi | A01D 41/1217 414/526 |
| 2008/0155956 A1* | 7/2008 | Miyamoto | A01D 43/0635 56/203 |
| 2009/0325658 A1 | 12/2009 | Phelan et al. | |
| 2010/0332051 A1* | 12/2010 | Kormann | A01D 43/073 701/2 |
| 2011/0213531 A1* | 9/2011 | Farley | A01D 41/1275 701/50 |
| 2014/0169932 A1* | 6/2014 | Farley | A01D 41/127 414/813 |
| 2015/0264866 A1* | 9/2015 | Foster | A01B 69/004 414/21 |
| 2016/0029559 A1* | 2/2016 | Inoue | A01D 41/1272 56/10.2 G |
| 2016/0037720 A1* | 2/2016 | Koch | A01D 41/1272 701/33.7 |
| 2016/0066507 A1* | 3/2016 | Inoue | A01B 79/005 460/59 |
| 2016/0174465 A1* | 6/2016 | Kohls | A01D 41/1217 414/518 |
| 2016/0192590 A1 | 7/2016 | Byttebier et al. | |
| 2016/0249533 A1* | 9/2016 | Byttebier | A01D 43/087 701/50 |
| 2018/0098494 A1* | 4/2018 | Ducroquet | A01D 41/1272 |

* cited by examiner

METHOD AND SYSTEM FOR UNLOADING HARVESTED CROP FROM AN AGRICULTURAL HARVESTER

FIELD

The present disclosure generally relates to agricultural harvesters and, more particularly, to methods and systems for unloading a desired quantity of harvested crop from an agricultural harvester.

BACKGROUND

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

In certain instances, the stored harvested crop is unloaded from the harvester into a nearby crop cart. More specifically, the harvester may include a crop discharge system, which conveys the harvested crop from the crop tank to a discharge location on the harvester. Once at the discharge location, the harvested crop is deposited into the crop cart. The crop discharge system may unload the harvested crop at a rate greater than (e.g., at least double) the rate at which harvested crop enters the crop tank. In this respect, to achieve such high unload rates, the crop discharge system must contain a small volume of the harvested crop conveyed at a high velocity or a large volume of the harvested crop conveyed at a low velocity.

When the crop cart is full, an operator of the harvester must halt unloading of the harvested crop to prevent the harvested crop from spilling out of the crop cart. However, after unloading of the crop is halted, a portion of the harvested crop is still present within the crop discharge system of the harvester. If the harvested crop present in the crop discharge system is not discharged before shut down, the harvester will have difficulty resuming the unloading process. More specifically, when a small volume of the harvested crop is unloaded at a high velocity, the harvester will have difficulty accelerating the stationary harvested crop present in the crop discharge system to the desired velocity. Similarly, when a large volume of the harvested crop is unloaded at a low velocity, the harvester will have difficulty generating sufficient torque to accelerate the large volume of stationary harvested crop present in the crop discharge system. As such, all harvested crop present within the crop discharge system must be discharged therefrom before the crop discharge system may be shut down. In this regard, the harvested crop present within the crop discharge system will be discharged onto the ground and wasted if the operator does not account for the harvested crop present within the crop discharge system before halting unloading.

Accordingly, an improved method and system for unloading a desired quantity of harvested crop from an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a method for unloading harvested crop from an agricultural harvester. The agricultural harvester may include a crop tank configured to store the harvested crop and a crop discharge system configured to convey the harvested crop from the crop tank to a discharge location on the agricultural harvester for discharge of the harvested crop therefrom. The agricultural harvester may further include a flow control device configured to selectively prevent the transfer of the harvested crop from the crop tank into the crop discharge system. The method may include monitoring, with a computing device, a quantity of the harvested crop discharged from the agricultural harvester based on sensor data indicative of the quantity of the harvested crop discharged from the agricultural harvester. The method may further include controlling, with the computing device, an operation of the flow control device to halt transfer of the harvested crop from the crop tank to the crop discharge system when a first quantity of the harvested crop has been discharged from the agricultural harvester. The first quantity of the harvested crop may be less than a desired quantity of the harvested crop to be discharged from the agricultural harvester. Additionally, the method may include continuing, with the computing device, to control an operation of the crop discharge system after halting further transfer of the harvested crop from the crop tank to the crop discharge system to convey any remaining harvested crop contained within the crop discharge system to the discharge location to allow a second quantity of the harvested crop to be discharged from the agricultural harvester. The sum of the first and second quantities of the harvested crop may be equal or substantially equal to the desired quantity of the harvested crop.

In another aspect, the present subject matter is directed to a system for unloading harvested crop. The system may include an agricultural harvester having a crop tank configured to store the harvested crop and a crop discharge system configured to convey the harvested crop from the crop tank to a discharge location on the agricultural harvester at which the harvested crop is discharged from the agricultural harvester. The agricultural harvester may further include a flow control device configured to selectively prevent the transfer of the harvested crop from the crop tank into the crop discharge system. The system may also include a sensor configured to detect a parameter indicative of a quantity of the harvested crop discharged from the agricultural harvester. Furthermore, the system may include a controller communicatively coupled to the sensor. The controller may be configured to monitor a quantity of the harvested crop discharged from the agricultural harvester based on measurement signals received from the sensor. The controller may also be configured to control an operation of the flow control device so as to halt further transfer of the harvested crop from the crop tank to the crop discharge system when a first quantity of the harvested crop has been discharged from the agricultural harvester. The first quantity may be less than a desired quantity of the harvested crop to be discharged from the agricultural harvester. Additionally, the controller may be configured to continue operation of the crop discharge system after halting further transfer of the harvested crop from the crop tank to the crop discharge system to convey any remaining harvested crop contained within the agricultural harvester to the discharge location to allow a second quantity of the harvested crop to be discharged from the agricultural harvester. The sum of the first and second quantities of the harvested crop being equal to or substantially equal to the desired quantity of the harvested crop.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
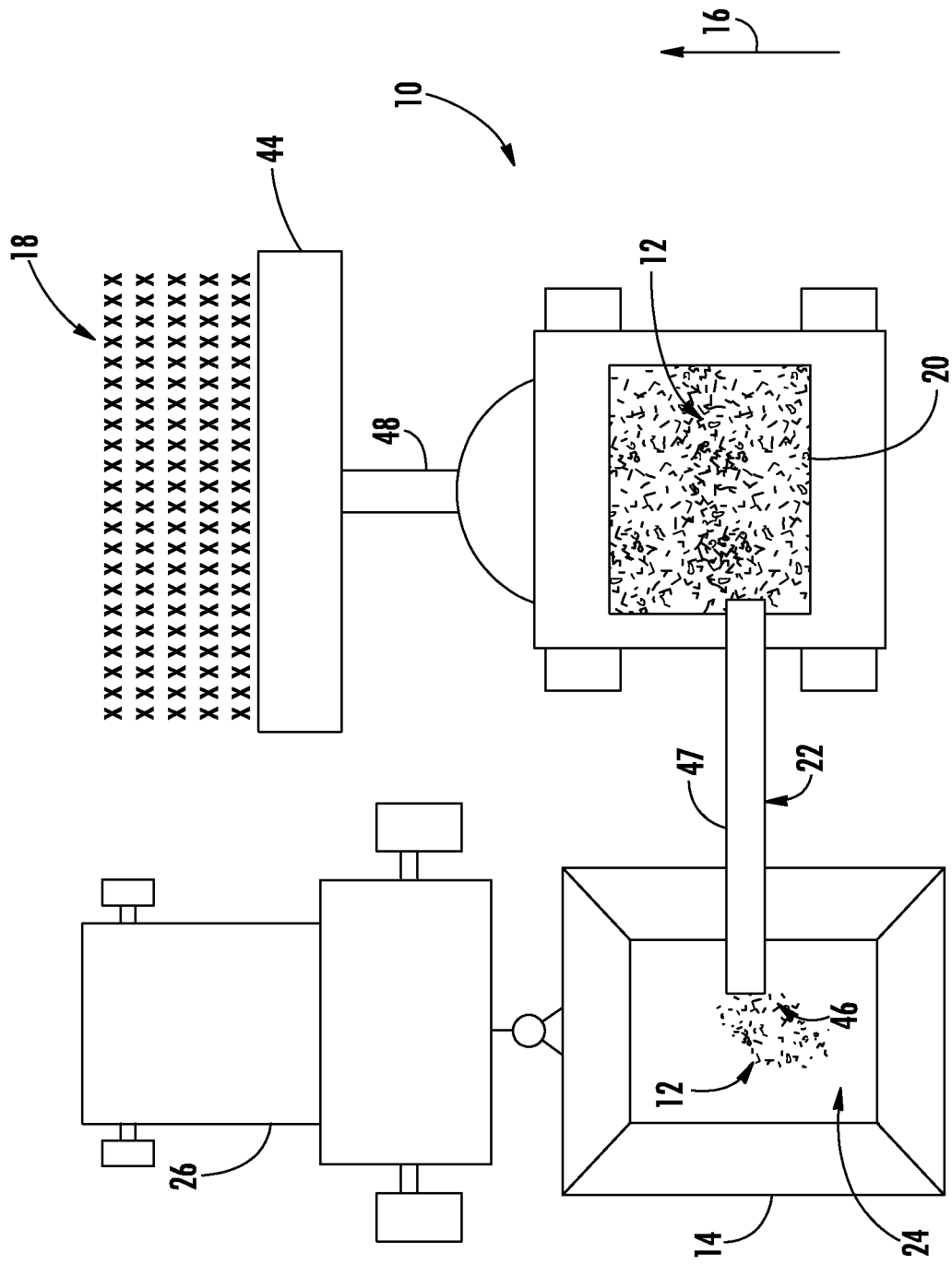
FIG. 1 illustrates a top view of one embodiment of an agricultural harvester unloading harvested crop into a crop cart in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods and systems for unloading a desired quantity of harvested crop from an agricultural harvester. Specifically, in several embodiments, a controller may be configured to receive measurement signals indicative of a quantity of the harvested crop discharged from the agricultural harvester. The controller may also be configured to monitor the quantity of the harvested crop discharged from the agricultural harvester based on the measurement signals. When a first quantity of the harvested crop has been discharged from the agricultural harvester, the controller may be configured to control the operation of a flow control device of the agricultural harvester to halt or stop the transfer of the harvested crop from a crop tank of the harvester to a crop discharge system of the harvester. In general, the first quantity of the harvested crop may be less than the desired quantity of the harvested crop to be discharged from the agricultural harvester. As such, transfer of the harvested crop to the crop discharge system will be halted before the desired quantity of the harvested crop has been unloaded from the agricultural harvester. Furthermore, the controller may be configured to continue operation of the crop discharge system after halting further transfer of the harvested crop to the crop discharge system to convey any remaining harvested crop contained within the crop discharge system to a discharge location of the agricultural harvester so as to allow a second quantity of the harvested crop to be discharged from the harvester. In general, the sum of the first and second quantities of the harvested crop may be equal to or substantially equal to the desired quantity of the harvested crop. Accordingly, the harvested crop present within the crop discharge system when transfer is halted may be discharged from the harvester such that the total quantity of harvested crop unloaded from the harvester is equal desired quantity. Furthermore, once the second quantity of the harvested crop is discharged from the harvester, the crop discharge system may be free of or substantially free of harvested crop such that the crop discharge system may be safely shut down.

Figure 2:
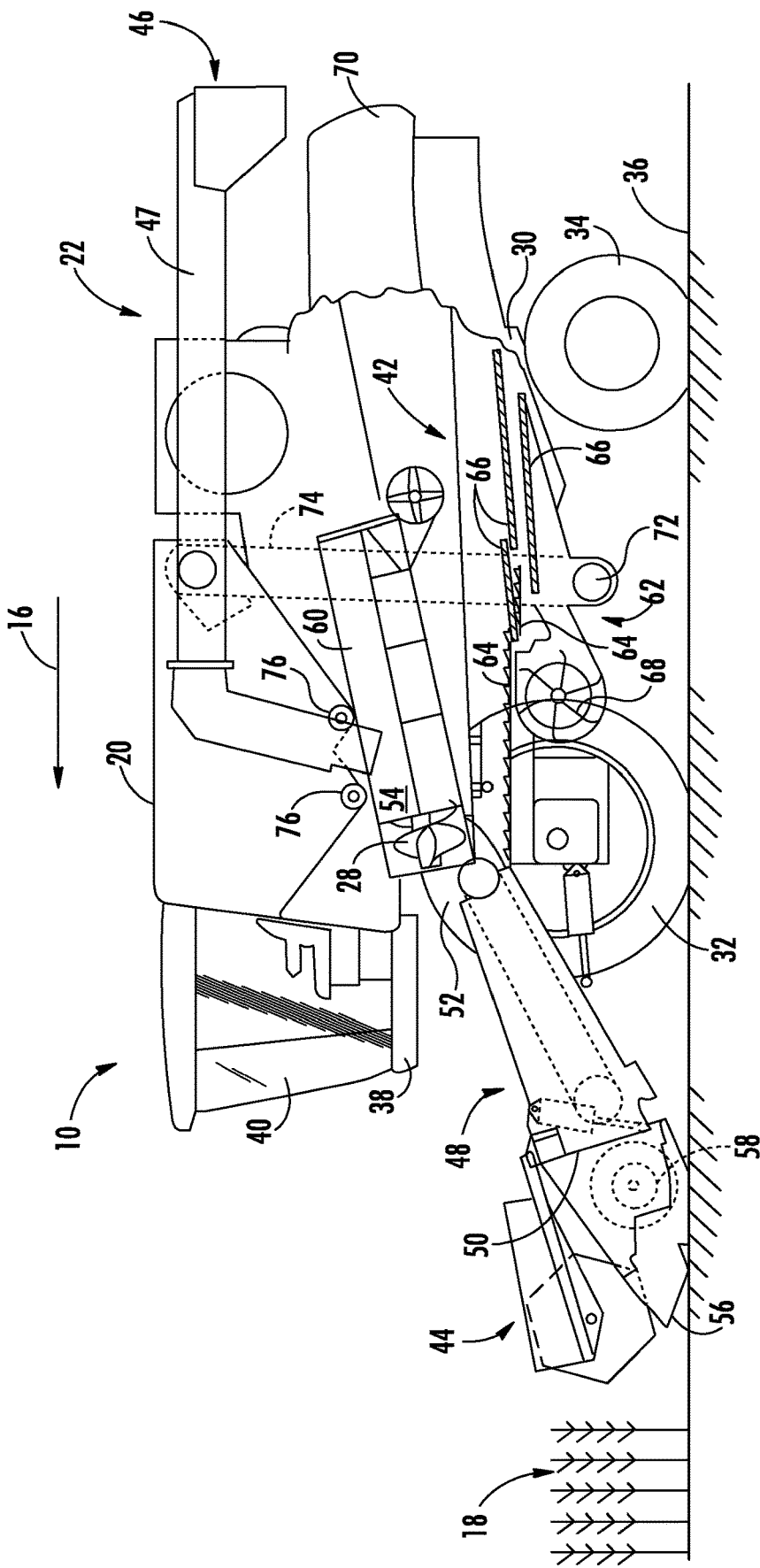
FIG. 2 illustrates a side view of one embodiment of an agricultural harvester in accordance with aspects of the present subject matter.

Referring now to the drawings, FIGS. 1 and 2 illustrate differing views of one embodiment of an agricultural harvester 10 in accordance with aspects of the present disclosure. Specifically, FIG. 1 illustrates a top view of the harvester 10 as is being used to unload harvested crop 12 into a crop cart 14. Additionally, FIG. 2 illustrates a partial sectional side view of the harvester 10, particularly illustrating various components of the harvester 10.

In general, the harvester 10 may be configured to move across a field in a direction of travel (e.g., as indicated by arrow 16) to harvest a standing crop 18. While traversing the field, the harvester 10 may be configured to process the harvested crop 12 and store the harvested crop 12 within a crop tank 20 of the harvester 10. Furthermore, the harvester 10 may be configured to unload the harvested crop 12 stored within the crop tank 20 via a crop discharge system 22 of the harvester 10. As shown, the harvested crop 12 may be discharged from the harvester 10 for receipt by a crop-receiving chamber 24 of the crop cart 14. For example, in one embodiment, the crop cart 14 may be towed across the field along the direction of travel 16 adjacent to the harvester 10 by a work vehicle 26. It should be appreciated that the work vehicle 26 may be any suitable work vehicle, such as an agricultural tractor. Furthermore, it should be appreciated that, in alternative embodiments, the harvester 10 may be configured to unload the harvested crop 12 into any other suitable container or vessel.

Referring now to FIG. 2, in one embodiment, the harvester 10 may be configured as an axial-flow type combine, wherein the harvested crop 12 is threshed and separated while it is advanced by and along a longitudinally arranged rotor 28. However, it should be appreciated that, in alternative embodiments, the harvester 10 may have any suitable harvester configuration.

As shown in FIG. 2, the harvester 10 may include a chassis or main frame 30 configured to support and/or couple to various components of the harvester 10. For example, in several embodiments. the harvester 10 may include a pair of driven, ground-engaging front wheels 32 and a pair of steerable rear wheels 34 that are coupled to the frame 30. As such, the wheels 32, 34 may be configured to support the harvester 10 relative to a ground surface 36 and move the harvester 10 in the forward direction of travel 16 relative to the ground surface 36. Furthermore, the harvester 10 may include an operator's platform 38 having an operator's cab 40, a crop processing system 42, the crop tank 20, and the crop discharge system 22 that are supported by the frame 30. As will be described below, the crop processing system 42 may be configured to perform various processing operations on the harvested crop 12 as the crop processing system 42 operates to transfer the harvested crop 12 between a harvesting implement (e.g., header 44) of the harvester 10 and the crop tank 20. Furthermore, the crop discharge system 22 may be configured to convey the harvested crop 12 from the crop tank 20 to a discharge location 46 on the harvester 10, such as a location on or adjacent to a discharge tube 47 of the crop discharge system 22. Additionally, as is generally understood, the harvester 10 may include an engine and a transmission mounted on the frame 30. The transmission may be operably coupled to the engine and may provide variably adjusted gear ratios for transferring engine power to the wheels 32, 34 via a drive axle assembly (or via axles if multiple drive axles are employed).

Moreover, as shown in FIG. 2, the header 44 and an associated feeder 48 of the crop processing system 42 may extend forward of the frame 30 and may be pivotally secured thereto for generally vertical movement. In general, the feeder 48 may be configured to serve as support structure for the header 44. As shown in FIG. 2, the feeder 48 may extend between a front end 50 coupled to the header 44 and a rear end 52 positioned adjacent to a threshing and separating assembly 54 of the crop processing system 42. As is generally understood, the rear end 52 of the feeder 48 may be pivotally coupled to a portion of the harvester 10 to allow the front end 50 of the feeder 48 and, thus, the header 44 to be moved upward and downward relative to the ground 36 to set the desired harvesting or cutting height for the header 44.

As the harvester 10 is propelled forwardly over the field with the standing crop 18, the crop material is severed from the stubble by a sickle bar 56 at the front of the header 44 and delivered by a header auger 58 to the front end 50 of the feeder 48, which supplies the harvested crop 12 to the threshing and separating assembly 54. As is generally understood, the threshing and separating assembly 54 may include a cylindrical chamber 60 in which the rotor 28 is rotated to thresh and separate the harvested crop 12 received therein. That is, the harvested crop 12 is rubbed and beaten between the rotor 28 and the inner surfaces of the chamber 60, whereby the grain, seed, or the like, is loosened and separated from the straw.

The harvested crop 12 that has been separated by the threshing and separating assembly 54 may fall onto a crop cleaning assembly 62 of the crop processing system 42. In general, the crop cleaning assembly 62 may include a series of pans 64 and associated sieves 66. As is generally understood, the separated harvested crop 12 may be spread out via oscillation of the pans 64 and/or sieves 66 and may eventually fall through apertures defined in the sieves 66. Additionally, a cleaning fan 68 may be positioned adjacent to one or more of the sieves 66 to provide an air flow through the sieves 66 that removes chaff and other impurities from the harvested crop 12. For instance, the fan 68 may blow the impurities off of the harvested crop 12 for discharge from the harvester 10 through the outlet of a straw hood 70 positioned at the back end of the harvester 10. The cleaned harvested crop 12 passing through the sieves 66 may then fall into a trough of an auger 72, which may be configured to transfer the harvested crop 12 to an elevator 74 for delivery to the crop tank 20.

Figure 3:
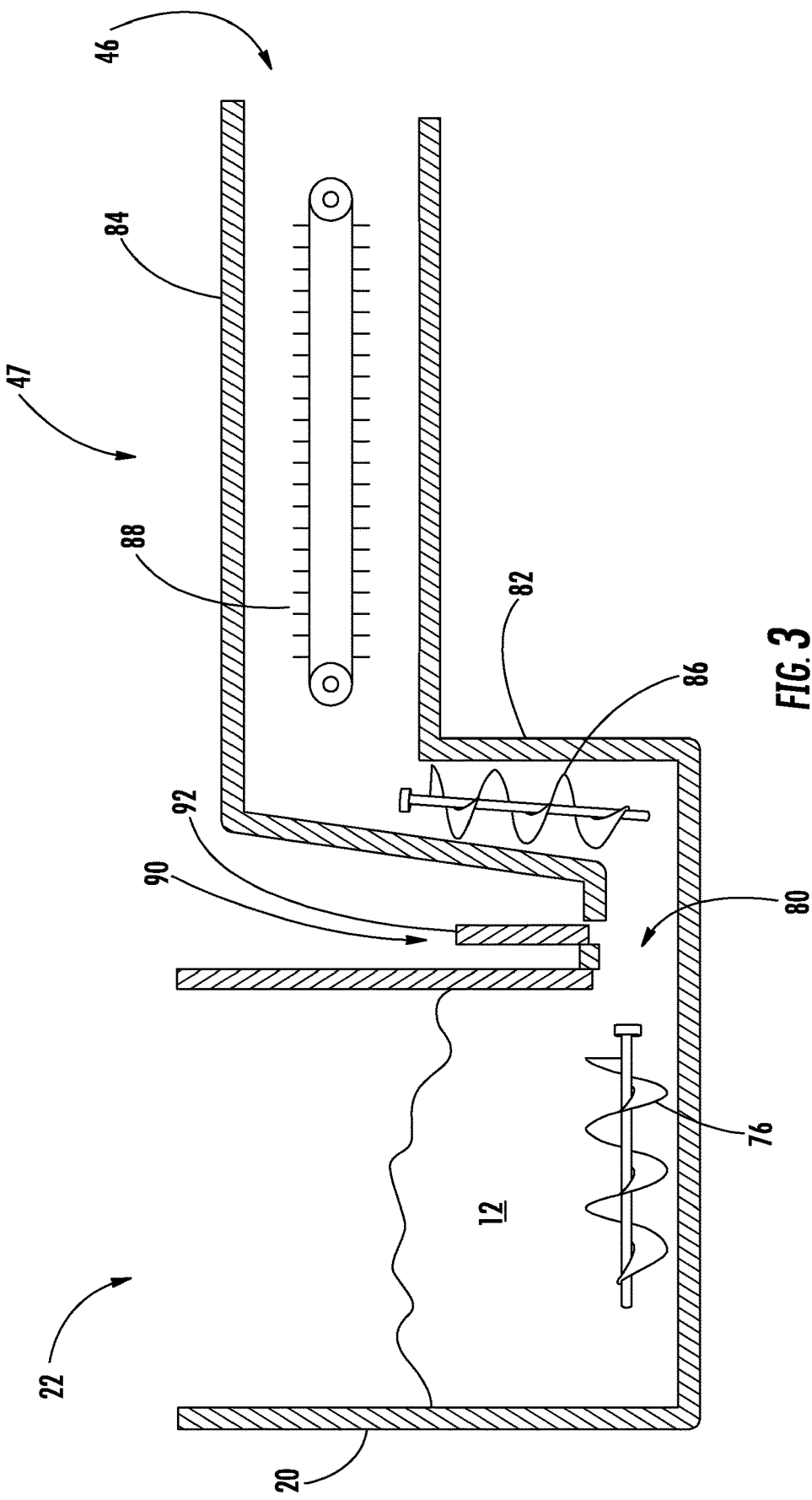
FIG. 3 illustrates a cross-section view of one embodiment of a crop discharge system of an agricultural harvester in accordance with aspects of the present subject matter.

Referring now to FIG. 3, one embodiment of the crop discharge system 22 is illustrated in accordance with aspects of the present disclosure. As shown, the crop discharge system 22 may include a pair of tank augers 76 (only one auger 76 is shown in FIG. 3) positioned at the bottom of the crop tank 20 for urging the harvested crop 12 sideways through an outlet 80 of the crop tank 20 and into the discharge tube 47 for eventual discharge from the harvester 10. In the embodiment illustrated in FIG. 3, the discharge tube 47 may include a first portion 82, which receives the harvested crop 12 from the crop tank 20, and a second portion 84, which receives the harvested crop from the first portion 82 of the discharge tube 47. In general, the first portion 82 of the discharge tube 47 may be generally vertically oriented, while the second portion 84 of the discharge tube 47 may be generally horizontally oriented. In one embodiment, the second portion 84 of the discharge tube 47 may moveable (e.g., rotatable and/or pivotable) relative to the first portion 82 of the discharge tube 47. It should be appreciated that, in alternative embodiments, the discharge tube 47 may have any suitable configuration. For example, the discharge tube 47 of the crop discharge system 22 may include more than two portions.

Figure 4:
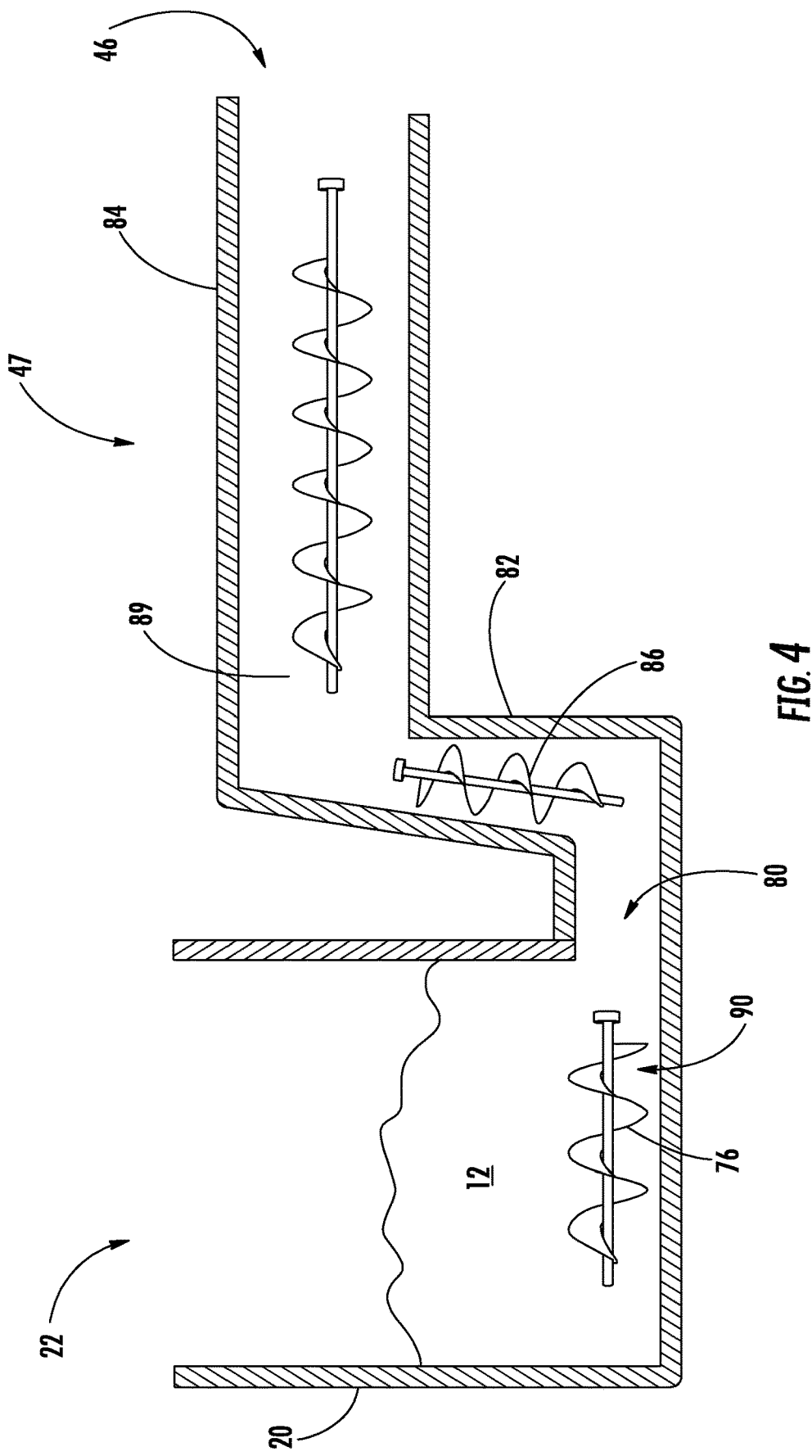
FIG. 4 illustrates a cross-section view of another embodiment of a crop discharge system of an agricultural harvester in accordance with aspects of the present subject matter.

The crop discharge system 22 may include various augers and/or conveyors for conveying the harvested crop 12 through the discharge tube 47. For example, as shown, in one embodiment, a discharge tube auger 86 of the crop discharge system 22 may convey the harvested crop 12 generally vertically from the outlet 80 of the crop tank 20 through first portion 82 of the discharge tube 47 to the second portion 84 of the discharge tube 47. Similarly, as shown in FIG. 3, a discharge tube conveyor 88 of the crop discharge system 22 may convey the harvested crop 12 through second portion 84 of the discharge tube 47 to the discharge location 46. The discharge tube conveyor 88 may be a suitable belt conveyor or a suitable drag conveyor. In an alternative embodiment, as shown in FIG. 4, a discharge tube conveyor 89 of the crop discharge system 22 may convey the harvested crop 12 through second portion 84 of the discharge tube 47 to the discharge location 46. It should be appreciated that, in further embodiments, the crop discharge system 22 may include suitable combination of augers, elevators, and/or conveyors configured for conveying the harvested crop 12 from the crop tank 20 to the discharge location 46.

Furthermore, in several embodiments, the harvester 10 may include a flow control device 90 positioned at or proximate to the outlet 80 of the crop tank 20. In general, the flow control device 90 may be configured to selectively prevent the transfer of the harvested crop 12 from the crop tank 20 to crop discharge system 22. For example, as shown in FIG. 3, in one embodiment, the flow control device 90 may be a suitable flow blocking device 92 that is configured to selectively occlude or block the outlet 80 of the crop tank 20 to prevent the harvested crop 12 from exiting the crop tank 20. As such, the flow blocking device 92 may be any suitable valve, damper, door, plate, or other impediment that may selectively occlude or block the outlet 80 of the crop tank 20. As shown in FIG. 4, in another embodiment, the flow control device 90 may be one or more of the tank augers 76. In this regard, the tank auger(s) 76 may permit transfer of the harvested crop 12 from the crop tank 20 to the crop discharge system 22 when the tank auger(s) 76 are rotating or otherwise being rotatably driven. Conversely, the tank auger(s) 76 may prevent transfer of the harvested crop 12 from the crop tank 20 to the crop discharge system 22 when the tank auger(s) 76 are stationary. However, it should be appreciated that the flow control device 90 may be any suitable device that selectively prevents the transfer of the harvested crop 12 between the crop tank 12 and the crop discharge system 22.

It should be appreciated that the configuration of the harvester 10 and crop discharge system 22 described above and shown in FIGS. 1-4 is provided only to place the present subject matter in an exemplary field of use. Thus, it should be appreciated that the present subject matter may be readily adaptable to any manner of harvester and/or crop discharge system configuration.

Figure 5:
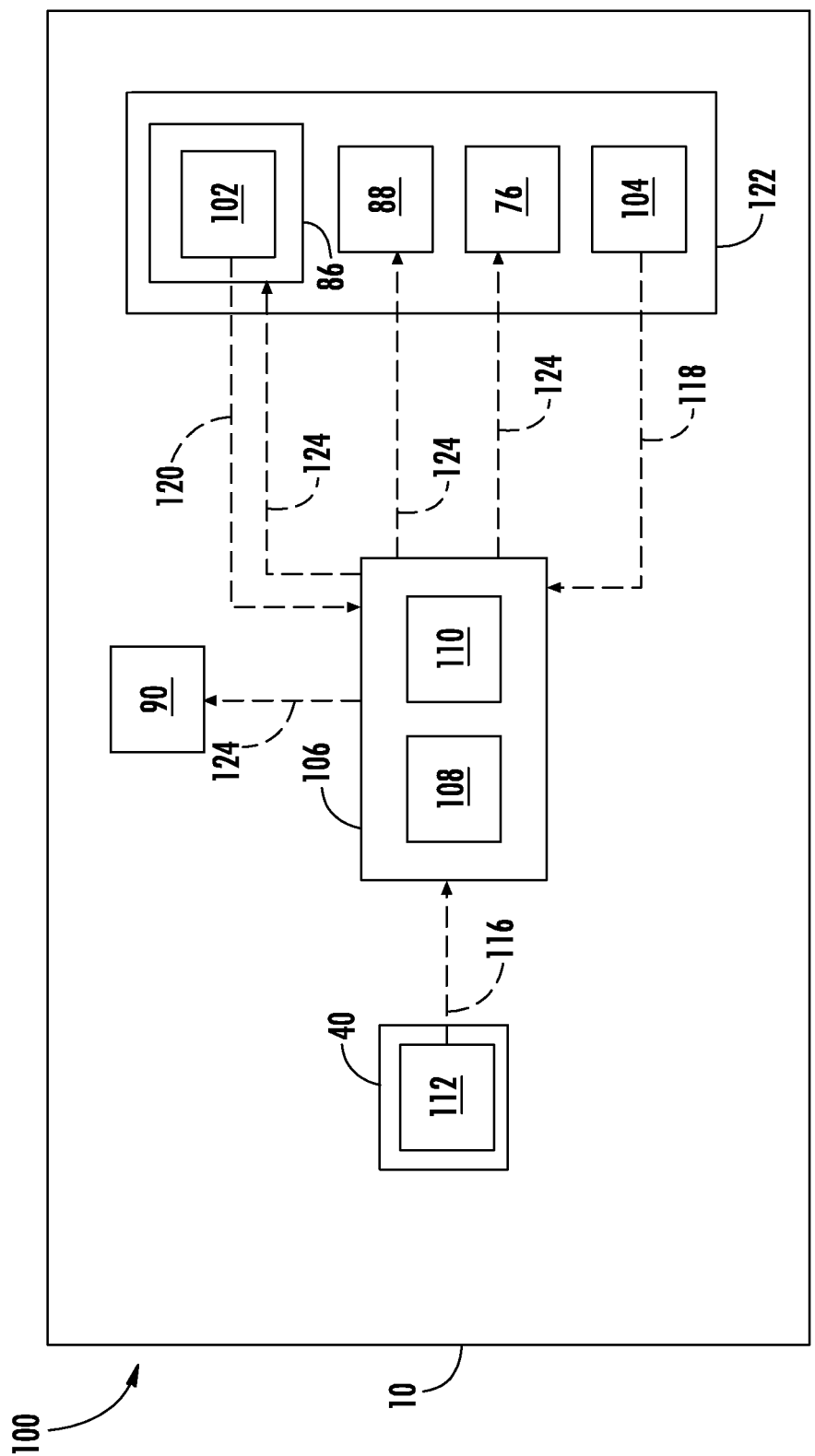
FIG. 5 illustrates a schematic view of one embodiment of a system for unloading harvested crop from an agricultural harvester in accordance with aspects of the present subject matter, particularly illustrating the system including a sensor provided in operative association with a discharge tube auger of a crop discharge system of the agricultural harvester.

Referring now to FIG. 5, a schematic view of one embodiment of a system 100 for unloading harvested crop from an agricultural harvester is illustrated in accordance with aspects of the present subject matter. In general, the system 100 will be described herein with reference to the harvester 10 and the crop discharge system 22 described above with reference to FIGS. 1-4. However, it should be appreciated by those of ordinary skill in the art that the disclosed system 100 may generally be utilized with harvesters having any other suitable harvester configuration and/or crop discharge systems having any other suitable crop discharge system configuration.

As shown in FIG. 5, the system 100 may include one or more components of the harvester 10. For example, in several embodiments, the system 100 may include one or more components of the crop discharge system 22 of the harvester 10, such as the tank augers 76, the discharge tube 47, the discharge tube auger 86, and/or the discharge tube conveyor 88. Additionally, the system 100 may include the crop tank 20 and/or the flow control device 90. However, it should be appreciated that the system 100 may include a suitable component or combination of components of the harvester 10.

Figure 6:
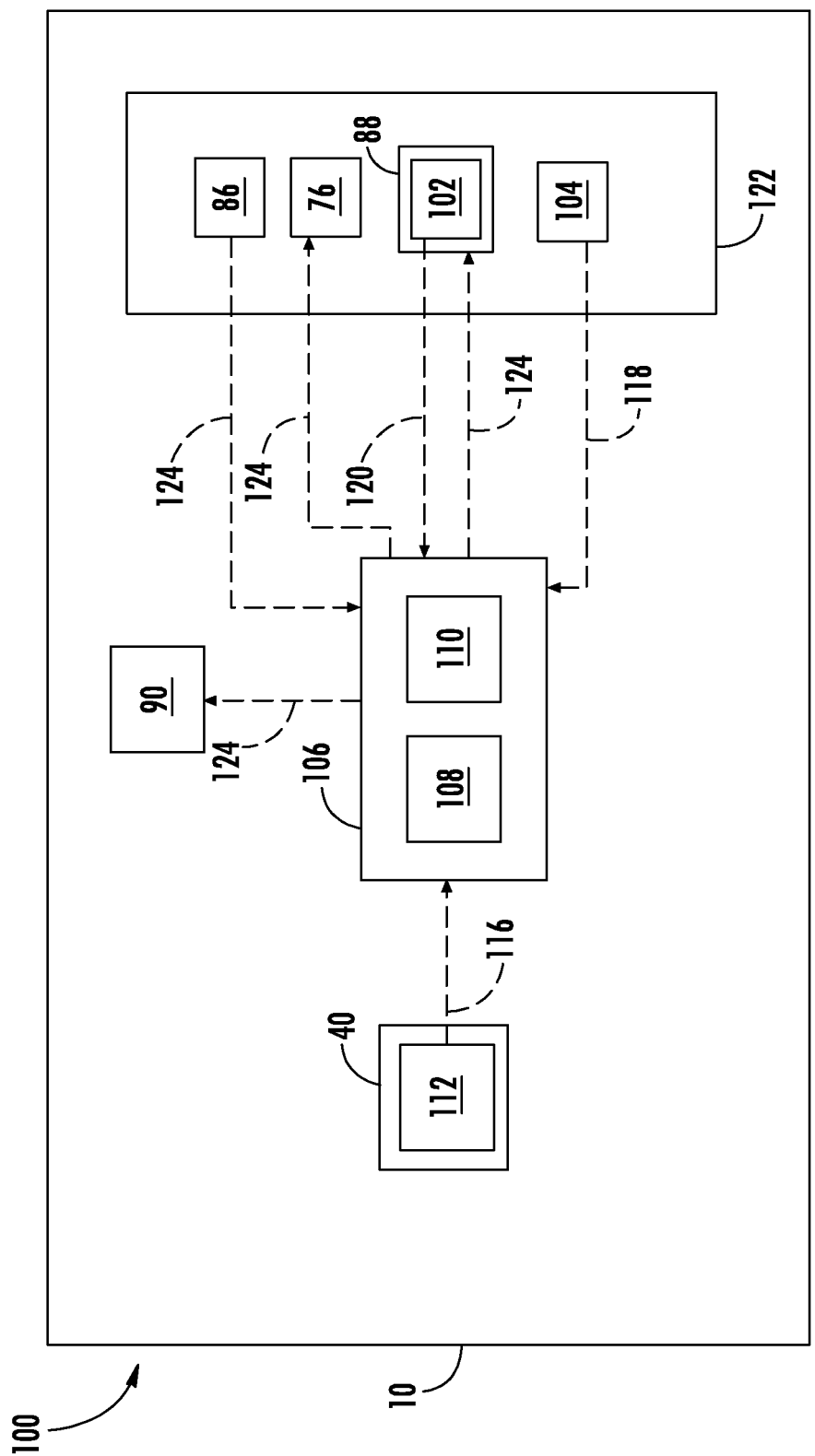
FIG. 6 illustrates a schematic view of another embodiment of a system for unloading harvested crop from an agricultural harvester in accordance with aspects of the present subject matter, particularly illustrating the system including a sensor provided in operative association with a discharge tube conveyor of a crop discharge system of the agricultural harvester.

Additionally, the system 100 may include a sensor 102 configured to detect a parameter indicative of a quantity of the harvested crop 12 discharged from the harvester 10 at the associated discharge location 46. In several embodiments, parameter may be associated with a flow rate of or a force/pressure exerted by the harvested crop 12 when the harvested crop 12 is flowing through the discharge tube 47. In general, when the parameter is associated with the force exerted by the harvested crop 12, the sensor 102 may be configured to detect the force with which the harvested crop 12 impacts the sensor 102 or a component of the crop discharge system 22, such as the tank augers 76, the discharge tube 47, the discharge tube auger 86, or the discharge tube conveyor 88. For example, as shown in FIG. 5, in one embodiment, the sensor 102 may be provided in operative association with the discharge tube auger 86 of the crop discharge system 22. In such embodiment, the sensor 102 may be configured to detect a force exerted on the auger 86 by the harvested crop 12, a speed at which the auger 86 is rotating, a flow rate of the harvested crop 12 through the auger 86, or a torque exerted by an actuator (not shown) of auger 86. Alternatively, as shown in FIG. 6, in another embodiment, the sensor 102 may be provided in operative association with the discharge tube conveyor 88 of the crop discharge system 22. In such embodiment, the sensor 102 may be configured to detect a force exerted on the conveyor 88 by the harvested crop 12, a speed at which a belt (not shown) of the conveyor 88 is rotating, a tension within the belt of the conveyor 88, or a torque exerted by an actuator (not shown) of conveyor 88. However, it should be appreciated that, in alternative embodiments, the sensor 102 may be provided in operative association with any other suitable component of the crop discharge system 22, such as the tank augers 76. Additionally, in a further embodiment, the sensor 102 may be provided in operative association with the crop cart 14 and configured to detect a weight of the harvested crop 12 that has been unloaded into the crop cart 14, which may provide an indication of the quantity of the harvested crop 12 discharged from the harvester 10.

Furthermore, it should be appreciated that the sensor 102 may generally correspond to any suitable sensing device configured for detecting a parameter indicative of the quantity of the harvested crop 12 discharged from the harvester 10. In this regard, the sensor 102 may correspond to one or more mass flow rate meters, torque transducers, load cells, strain gauges, position/speed sensors (e.g., Hall Effect sensors), and/or the like. In certain embodiments, the system 100 may include a plurality of sensors 102, such as a first sensor configured to detect a flow rate of the harvested crop 12 being discharged from the harvester 10 and a second sensor configured to detect a force of the harvested crop 12 being discharged from the harvester 10.

Figure 7:
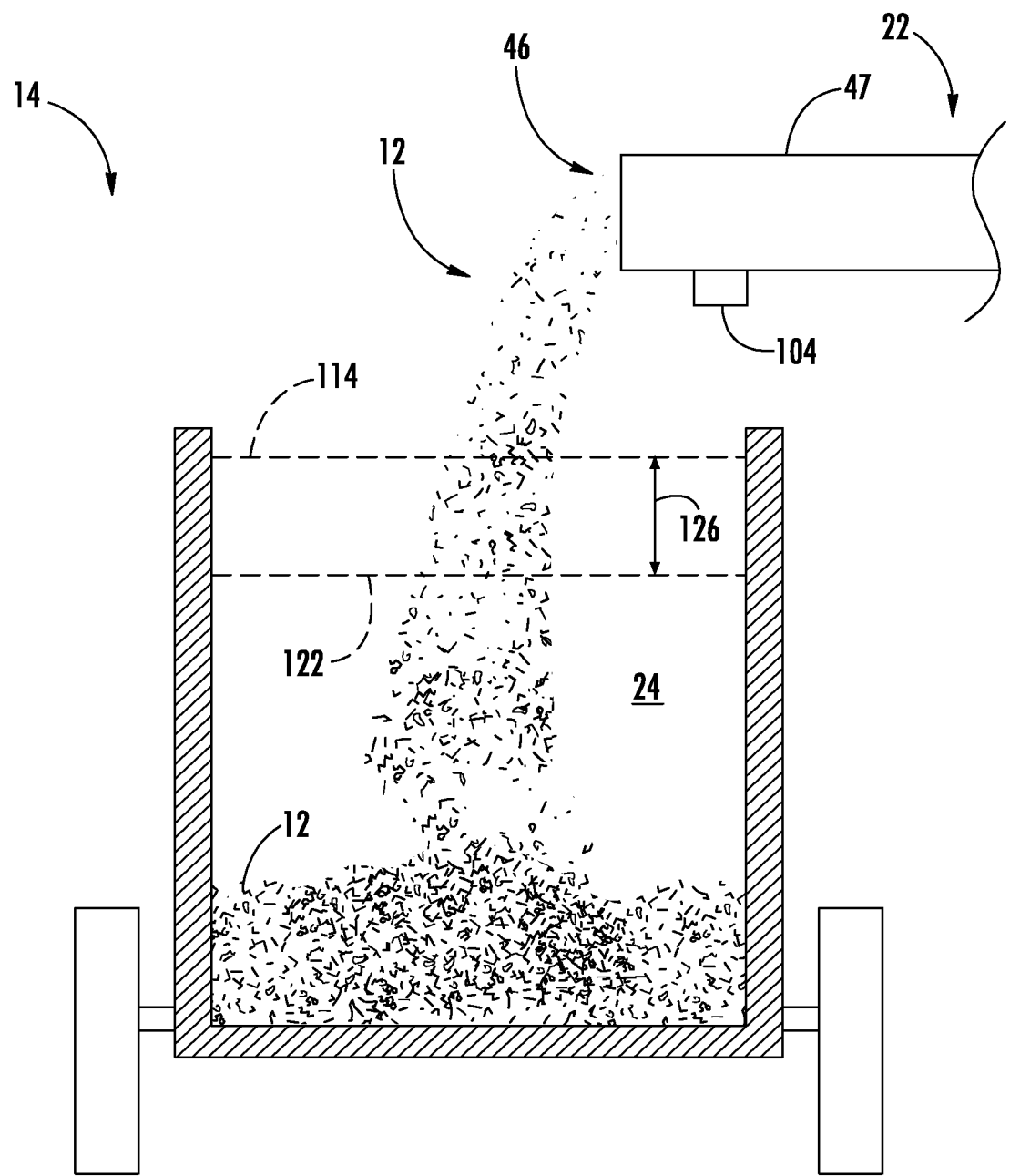
FIG. 7 illustrates a cross-sectional view of the crop cart in accordance with aspects of the present subject matter, particularly illustrating a crop cart receiving harvested crop discharged from an discharge tube of an agricultural harvester.

Moreover, in some embodiments, the system 100 may include an image capture device 104 configured to capture one or more images of the crop-receiving chamber 24 of the crop cart 14. For example, as shown in FIG. 7, the image capture device 104 may be coupled to and/or positioned on the discharge tube 47 so as to capture images of the crop-receiving chamber 24 of the crop cart 14. As will be described, these captured images may be indicative of a volume of the crop-receiving chamber 24 available to receive the harvested crop 12 discharged from the harvester 10. Additionally, in one embodiment, the captured images may also be indicative of the quantity of the harvested crop 12 that has been discharged from the harvester 10. It should be appreciated that the image capture device 104 may be any suitable device configured to capture two- or three-dimensional images, such as a complementary metal-oxide-semiconductor (CMOS) device or a charge coupled device (CCD). Furthermore, some embodiments of the system 100 may not include the image capture device 104.

In accordance with aspects of the present subject matter, the system 100 may also include a controller 106 configured to electronically control the operation of one or more components of the harvester 10. In general, the controller 106 may comprise any suitable processor-based device known in the art, such as a computing device or any suitable combination of computing devices. Thus, in several embodiments, the controller 106 may include one or more processor(s) 108 and associated memory device(s) 110 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 110 of the controller 106 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 110 may generally be configured to store suitable computer-readable instructions that, when implemented by the processor(s) 108, configure the controller 106 to perform various computer-implemented functions, such as one or more aspects of the method 200 described below with reference to FIG. 8. In addition, the controller 106 may also include various other suitable components, such as a communications circuit or module, one or more input/output channels, a data/control bus and/or the like.

It should be appreciated that the controller 106 may correspond to an existing controller of the harvester 10 or the controller 106 may correspond to a separate processing device. For instance, in one embodiment, the controller 106 may form all or part of a separate plug-in module that may be installed within the harvester 10 to allow for the disclosed system and method to be implemented without requiring additional software to be uploaded onto existing control devices of the harvester 10.

Furthermore, in some embodiments, the system 100 may include a user interface 112 configured to receive an input from an operator of the harvester 10, such as an input associated with a desired quantity of the harvested crop 12 to be discharged from the harvester 10. As such, in one embodiment, the user interface 112 may be positioned within the operator's cab 40 of the harvester 10. However, it should be appreciated that the user interface 112 may be positioned in any suitable location, including positions remote from the harvester 10. Furthermore, it should be appreciated that the user interface 112 may include one or more input devices, such as touchscreens, keypads, touchpads, knobs, buttons, sliders, switches, mice, microphones, and/or the like.

In several embodiments, the controller 106 may be configured to receive or determine the desired quantity of the harvested crop 12 to be discharged from the harvester 10, such as into the crop cart 14. In general, as shown in FIG. 7, the desired quantity (e.g., as indicated by dashed line 114 in FIG. 7) of the harvested crop 12 may correspond to a quantity of the harvested crop 12 that fills or substantially fills the crop-receiving chamber 24 of the crop cart 14. However, in certain instances, the desired quantity 114 of the harvested crop 12 may fill only a portion of the crop-receiving chamber 24. Furthermore, in one embodiment, the controller 106 may be configured to receive an input indicative of the desired quantity 114 of the harvested crop 12 from the user interface 112. Specifically, as shown in FIGS. 5 and 6, in such embodiment, the controller 106 may be communicatively coupled to the user interface 112 via a wired or wireless connection to allow user input signals (e.g., indicated by dashed lines 116 in FIGS. 5 and 6) to be transmitted from the user interface 112 to the controller 106. As such, the controller 106 may be configured to receive a notification from the operator of the harvester 10 indicative of the desired quantity 114 of the harvested crop 12.

However, in another embodiment, the controller 106 may be configured to determine the desired quantity 114 of the harvested crop 12 based on the images received from the image capture device 104. Specifically, in such embodiment, the controller 106 may be communicatively coupled to the image capture device 104 via a wired or wireless connection to allow image signals (e.g., indicated by dashed lines 118 in FIGS. 5 and 6) to be transmitted from the image capture device 104 to the controller 106. As such, the controller 106 may be configured to determine a volume of the crop-receiving chamber 24 of the crop cart 14 based on the received images, such as through the use of a suitable algorithm stored in the memory device(s) 110. In this regard, the desired quantity 114 of the harvested crop 12 may be determined based on the volume of the crop-receiving chamber 24.

In accordance with aspects of the present subject matter, the controller 106 may be configured to monitor a quantity of the harvested crop 12 discharged from the harvester 10. Specifically, the controller 106 may be communicatively coupled to the sensor 102 via a wired or wireless connection to allow measurement signals (e.g., indicated by dashed line 120 in FIGS. 5 and 6) to be transmitted from the sensor 102 to the controller 106. As such, the controller 106 may be configured determine or estimate the quantity of the harvested crop 12 discharged from the harvester 10 based on the measurement signals 120 received from the sensor 102. For instance, the controller 106 may include a look-up table or suitable mathematical formula stored within its memory 110 that correlates the sensor measurements to the quantity of the harvested crop 12 discharged from the harvester 10. In an alternative embodiment, the controller 106 may be configured to monitor the quantity of the harvested crop 12 discharged from the harvester 10 based on the images received from the image capture device 104.

In one embodiment, the controller 106 may be configured to monitor a flow rate of the harvested crop 12 discharged from the harvester 10 relative to a threshold flow rate. For instance, the threshold flow rate may correspond to a flow rate that is indicative of a blockage within the crop discharge system 22 (e.g., in the discharge tube 47) of the harvester 10. In such embodiment, the controller 106 may be configured to compare the monitored flow rate to the threshold flow rate. When the monitored flow rate falls below the threshold flow rate flow, the controller 106 may be configured to control the operation of the flow control device 90 so as to halt further transfer of the harvested crop 12 from the crop tank 20 to the crop discharge system 22. Furthermore, in one embodiment, the controller 106 may be configured to control the operation of the crop discharge system 22 when the monitored flow rate falls below the threshold flow rate flow, thereby preventing excessive wear on the harvester 10.

Furthermore, when a first quantity of the harvested crop 12 has been discharged from the harvester 10, the controller 106 may be configured to control an operation of the flow control device 90 so as to halt further transfer of the harvested crop 12 from the crop tank 20 to the crop discharge system 22. In general, as shown in FIG. 7, the first quantity (e.g., as indicated by dashed line 122) of the harvested crop 12 may be less than the desired quantity 114 of the harvested crop 12 to be discharged from the harvester 10. Specifically, as shown in FIGS. 5 and 6, the controller 106 may be communicatively coupled to the flow control device 90 via a wired or wireless connection to allow control signals (e.g., indicated by dashed line 124 in FIGS. 5 and 6) to be transmitted from the controller 106 to the flow control device 90. As such, the control signals 124 may be configured to instruct to the flow control device 90 to prevent further transfer of the harvested crop 12 into the crop discharge system 22. For example, in embodiments where the flow control device 90 is a flow blocking device 92, the control signals 124 may be configured to instruct the flow blocking device 92 to occlude or otherwise block the outlet 80 of the crop tank 20. In embodiments wherein the flow control device is one or more of the tank augers 76, the control signals 124 may be configured to instruct the tank auger(s) 76 to cease rotating or otherwise become stationary.

Additionally, the controller 106 may be configured to control the various components of the crop discharge system 22 so as to continue their operation after halting further transfer of the harvested crop 12 from the crop tank 20 to the crop discharge system 22. As such, any remaining harvested crop 12 contained within the crop discharge system 22 may be conveyed to the discharge location 46 to allow a second quantity (e.g., as indicated by arrow 126 in FIG. 7) of the harvested crop 12 to be discharged from the harvester 10. In general, as shown in FIG. 7, the sum of the first and second quantities 122, 126 of the harvested crop 12 may be equal or substantially equal to the desired quantity 114 of the harvested crop 12. For example, in one embodiment, the sum of the first and second quantities 122, 126 may be substantially equal to the desired quantity 114 if this sum is within five percent of the desired quantity 114. In another embodiment, the sum of the first and second quantities 122, 126 may be substantially equal to the desired quantity 114 if this sum is within ten percent of the desired quantity 114. In this regard, after all or substantially all of the harvested crop 12 is discharged from the crop discharge system 22 of the harvester 10 once further transfer of the harvested crop 12 from the crop tank 20 to the crop discharge system 22 is halted, the total quantity of the harvested crop 12 unloaded into the crop cart 14 (e.g., the sum of the first and second quantities 122, 126) may generally be equal to the desired quantity 114. For example, in one embodiment, substantially all of the harvested crop 12 may be discharged from the crop discharge system 22 when ninety-five percent of the harvested crop 12 present within the crop discharge system 22 is discharged. In another embodiment, substantially all of the harvested crop 12 may be discharged from the crop discharge system 22 when ninety-nine percent of the harvested crop 12 present within the crop discharge system 22 is discharged. After the second quantity 126 of the harvested crop 12 is discharged from the harvester 10, the controller 106 may then be configured to terminate operation of the crop discharge system 22.

For instance, the controller 106 may be communicatively coupled to the tank augers 76, the discharge tube auger 86, and the discharge tube conveyor 88 via a wired or wireless connection to allow the control signals 124 to be transmitted from the controller 106 to the crop discharge system components 76, 86, 88. As such, the controller 106 may be configured to control (e.g., via the control signals 124) the tank augers 76, the discharge tube auger 86, and the discharge tube conveyor 88 to continue operation thereof after halting further transfer of the harvested crop 12 from the crop tank 20 to the crop discharge system 22. After all of the harvested crop 12 present within crop discharge system 22 is discharged therefrom, the controller 106 may be configured to control (e.g., via the control signals 124) these components 76, 86, 88 to terminate operation thereof.

Figure 8:
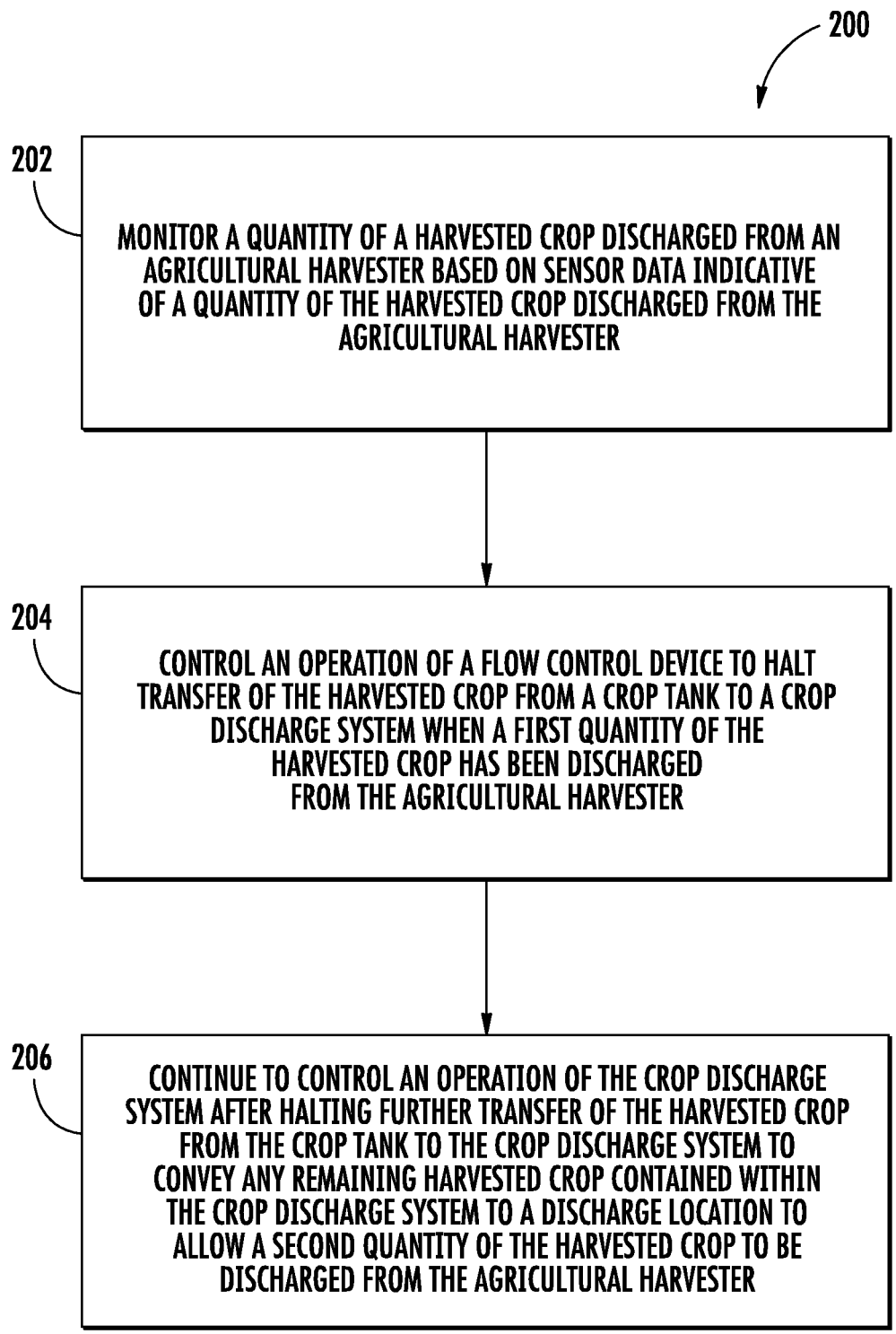
FIG. 8 is a flow diagram of one embodiment of a method for unloading harvested crop from an agricultural harvester in accordance with aspects of the present subject matter.

Referring now to FIG. 8, a flow diagram of one embodiment of a method 200 for unloading harvested crop from an agricultural harvester is illustrated in accordance with aspects of the present subject matter. In general, the method 200 will be described herein with reference to the harvester 10 and the system 100 described above with reference to FIGS. 1-7. However, it should be appreciated by those of ordinary skill in the art that the disclosed method 200 may generally be utilized to unload harvested crop from an agricultural harvester having any suitable harvester configuration and/or as part of a system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include monitoring, with a computing device, a quantity of a harvested crop discharged from an agricultural harvester based on sensor data indicative of the quantity of the harvested crop discharged from the agricultural harvester. For instance, as indicated above, the controller 106 may be communicatively coupled to the sensor 102 configured to monitor a quantity of the harvested crop 12 discharged from the harvester 10. As such, the controller 106 may be configured to monitor the quantity of the harvested crop 12 discharged from the harvester 10 based on measurement signals or sensor data 120 received from the sensor 102.

Additionally, at (204), the method 200 may include controlling, with the computing device, an operation of a flow control device to halt transfer of the harvested crop from a crop tank to a crop discharge system when a first quantity of the harvested crop has been discharged from the agricultural harvester. For instance, as indicated above, the controller 106 may be communicatively coupled to the flow control device 90 of the harvester 10. As such, when the first quantity 122 of the harvested crop 12 has been discharged from the harvester 10, the controller 106 may be configured to transmit control signals 124 to the flow control device 90 instructing the flow control device to prevent further transfer of the harvested crop 12 from the crop tank 20 to the crop discharge system 22.

Moreover, as shown in FIG. 6, at (206), the method 200 may include continuing, with the computing device, to control an operation of the crop discharge system after halting further transfer of the harvested crop from the crop tank to the crop discharge system to convey any remaining harvested crop contained within the crop discharge system to the discharge location to allow a second quantity of the harvested crop to be discharged from the agricultural harvester. For instance, as indicated above, the controller 106 may be communicatively coupled to the various components of the crop discharge system 22. As such, when further transfer of the harvested crop 12 from the crop tank 20 to the crop discharge system 22 is halted, the controller 106 may be configured to transmit control signals 124 to the various components of the crop discharge system 22 so as to continue controlling the operation of such components in a manner that allows any remaining harvested crop 12 contained within the crop discharge system 22 to be conveyed to the discharge location 46 to allow the second quantity 126 of the harvested crop 12 to be discharged from the harvester 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for unloading harvested crop from an agricultural harvester, the agricultural harvester including a crop tank configured to store the harvested crop and a crop discharge system configured to convey the harvested crop from the crop tank to a discharge location on the agricultural harvester for discharge of the harvested crop therefrom, the agricultural harvester further including a flow control device configured to selectively prevent the transfer of the harvested crop from the crop tank into the crop discharge system, the method comprising:

monitoring, with a computing device, a quantity of the harvested crop discharged from the agricultural harvester based on sensor data indicative of the quantity of the harvested crop discharged from the agricultural harvester;

controlling, with the computing device, an operation of the flow control device to halt transfer of the harvested crop from the crop tank to the crop discharge system when a first quantity of the harvested crop has been discharged from the agricultural harvester, the first quantity of the harvested crop being less than a desired quantity of the harvested crop to be discharged from the agricultural harvester; and continuing, with the computing device, to control an operation of the crop discharge system after halting further transfer of the harvested crop from the crop tank to the crop discharge system to convey any remaining harvested crop contained within the crop discharge system to the discharge location to allow a second quantity of the harvested crop to be discharged from the agricultural harvester, the sum of the first and second quantities of the harvested crop being equal or substantially equal to the desired quantity of the harvested crop.

2. The method of claim 1, further comprising:

continuing, with the computing device, to control an operation of a conveyor of the crop discharge system after halting further transfer of the harvested crop from the crop tank to the crop discharge system such that all or substantially all of the harvested crop present in the crop discharge system is discharged from the crop discharge system; and terminating, with the computing device, operation of the crop discharge system after all or substantially all of the harvested crop present within the crop discharge system is discharged from the crop discharge system.

3. The method of claim 1, wherein the received sensor data is associated with a flow rate of the harvested crop being discharged from the agricultural harvester.

4. The method of claim 3, further comprising:

monitoring, with the computing device, the flow rate of the harvested crop discharged from the agricultural harvester relative to a threshold; and controlling, with the computing device, an operation of the crop discharge system so as to terminate operation of the crop discharge system when the monitored flow rate of the harvested crop discharged from the agricultural harvester is below the threshold.

5. The method of claim 1, wherein the received sensor data is associated with a force of the harvested crop being discharged from the agricultural harvester.

6. The method of claim 1, further comprising:

receiving, with the computing device, one or more images of a container configured to receive the harvested crop that has been discharged from the agricultural harvester; and determining, with the computing device, a volume of the container based on the received images, the desired quantity of the harvested crop being determined based on the volume of the container.

7. The method of claim 1, further comprising:

receiving, with the computing device, an input indicative of the desired quantity of the harvested crop from a user interface.

8. The method of claim 1, wherein the received sensor data is associated with a flow rate of the harvested crop being discharged from the agricultural harvester and a force of the harvested crop being discharged from the agricultural harvester, the method further comprising:

receiving, with the computing device, an input indicative of the desired quantity of the harvested crop from a user interface;

monitoring, with the computing device, the flow rate of the harvested crop discharged from the agricultural harvester relative to a threshold; and controlling, with the computing device, an operation of the crop discharge system so as to terminate operation of the crop discharge system when the monitored flow rate of the harvested crop discharged from the agricultural harvester is below the threshold;

continuing, with the computing device, to control an operation of a conveyor of the crop discharge system after halting further transfer of the harvested crop from the crop tank to the crop discharge system such that all or substantially all of the harvested crop present in the crop discharge system is discharged from the crop discharge system; and terminating, with the computing device, operation of the crop discharge system after all or substantially all of the harvested crop present within the crop discharge system is discharged from the crop discharge system.

9. A system for unloading harvested crop, the system comprising:

an agricultural harvester including a crop tank configured to store the harvested crop and a crop discharge system configured to convey the harvested crop from the crop tank to a discharge location on the agricultural harvester at which the harvested crop is discharged from the agricultural harvester, the agricultural harvester further including a flow control device configured to selectively prevent the transfer of the harvested crop from the crop tank into the crop discharge system;

a sensor configured to detect a parameter indicative of a quantity of the harvested crop discharged from the agricultural harvester; and a controller communicatively coupled to the sensor, the controller being configured to:

monitor a quantity of the harvested crop discharged from the agricultural harvester based on measurement signals received from the sensor;

control an operation of the flow control device so as to halt further transfer of the harvested crop from the crop tank to the crop discharge system when a first quantity of the harvested crop has been discharged from the agricultural harvester, the first quantity being less than a desired quantity of the harvested crop to be discharged from the agricultural harvester; and continue operation of the crop discharge system after halting further transfer of the harvested crop from the crop tank to the crop discharge system to convey any remaining harvested crop contained within the agricultural harvester to the discharge location to allow a second quantity of the harvested crop to be discharged from the agricultural harvester, the sum of the first and second quantities of the harvested crop being equal to or substantially equal to the desired quantity of the harvested crop.

10. The system of claim 9, wherein the crop discharge system comprises a conveyor positioned within a discharge tube of the crop discharge system, the controller further being configured to:

continue operation the conveyor after halting further transfer of the harvested crop from the crop tank to the unloading system such that all or substantially all of the harvested crop present within the crop discharge system is discharged from the crop discharge system; and terminate operation of the crop discharge system after all or substantially all of the harvested crop present within the crop discharge system is discharged from the crop discharge system.

11. The system of claim 9, wherein the flow control device comprises an auger.

12. The system of claim 9, wherein the flow control device comprises a flow blocking device.

13. The system of claim 9, wherein the sensor is configured to detect a flow rate of the harvested crop being discharged from the agricultural harvester.

14. The system of claim 13, wherein the controller is further configured to:

monitor the flow rate of the harvested crop discharged from the agricultural harvester relative to a threshold; and control an operation of the crop discharge system so as to terminate operation of the crop discharge system when the monitored flow rate of the harvested crop discharged from the agricultural harvester is below the threshold.

15. The system of claim 9, wherein the sensor is configured to detect a force of the harvested crop being discharged from the agricultural harvester.

16. The system of claim 9, wherein the sensor is provided in operative association with a discharge tube auger positioned with a discharge tube of the crop discharge system.

17. The system of claim 9, wherein the sensor is provided in operative association with a discharge tube conveyor positioned with a discharge tube of the crop discharge system.

18. The system of claim 9, further comprising:

an image capture device configured to capture an image of a container configured to receive the harvested crop that has been discharged from the agricultural harvester, the controller being communicatively coupled to the image capture device, the controller being further configured to determine a volume of the container based on images received from the image capture device, the desired quantity of the harvested crop being determine based on the volume of the container.

19. The system of claim 9, wherein the controller is further configured to receive an input indicative of the desired quantity of the harvested crop from a user interface.

20. The system of claim 9, wherein the flow control device comprises a flow blocking device, the sensor comprising a first sensor configured to detect a flow rate of the harvested crop being discharged from the agricultural harvester and a second sensor configured to detect a force of the harvested crop being discharged from the agricultural harvester, the controller further being configured to:

receive an input indicative of the desired quantity of the harvested crop from a user interface;

monitor the flow rate of the harvested crop discharged from the agricultural harvester relative to a threshold; and control an operation of the crop discharge system so as to terminate operation of the crop discharge system when the monitored flow rate of the harvested crop discharged from the agricultural harvester is below the threshold;

continue operation the conveyor after halting further transfer of the harvested crop from the crop tank to the unloading system such that all or substantially all of the harvested crop present within the crop discharge system is discharged from the crop discharge system; and terminate operation of the crop discharge system after all or substantially all of the harvested crop present within the crop discharge system is discharged from the crop discharge system.

* * * * *